United States Patent
Shimizu et al.

(10) Patent No.: US 9,066,096 B2
(45) Date of Patent: Jun. 23, 2015

(54) VIDEO ENCODING METHOD AND DECODING METHOD, APPARATUSES THEREFOR, PROGRAMS THEREFOR, AND STORAGE MEDIA WHICH STORE THE PROGRAMS

(75) Inventors: Shinya Shimizu, Yokosuka (JP); Masaki Kitahara, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 854 days.

(21) Appl. No.: 12/517,457

(22) PCT Filed: Dec. 26, 2007

(86) PCT No.: PCT/JP2007/074941
§ 371 (c)(1),
(2), (4) Date: Jun. 3, 2009

(87) PCT Pub. No.: WO2008/081810
PCT Pub. Date: Jul. 10, 2008

(65) Prior Publication Data
US 2010/0034260 A1    Feb. 11, 2010

(30) Foreign Application Priority Data
Dec. 28, 2006 (JP) ................... 2006-353628

(51) Int. Cl.
*H04N 19/103* (2014.01)
*H04N 19/597* (2014.01)
(Continued)

(52) U.S. Cl.
CPC ........... *H04N 19/103* (2014.11); *H04N 19/597* (2014.11); *H04N 19/176* (2014.11);
(Continued)

(58) Field of Classification Search
CPC . H04N 19/103; H04N 19/597; H04N 19/176; H04N 19/147; H04N 19/61; H04N 19/146; H04N 19/182; H04N 19/19; H04N 19/573
See application file for complete search history.

(56) References Cited

U.S. PATENT DOCUMENTS 7,379,496 B2 *  5/2008  Holcomb et al. ........ 375/240.03
7,728,878 B2 *  6/2010  Yea et al. .................. 348/218.1
(Continued)

FOREIGN PATENT DOCUMENTS

JP     7-240944 A     9/1995
JP     9-275578 A     10/1997
(Continued)

OTHER PUBLICATIONS

"Survey of Algorithms used for Multi-view Video Coding (MVC)," ISO/IEC JTC1/SC29/WG11, MPEG2005/N6909, Hong Kong, Jan. 2005, pp. 1-10.
(Continued)

*Primary Examiner* — Christopher S Kelley
*Assistant Examiner* — Maria Vazquez Colon
(74) *Attorney, Agent, or Firm* — Harness, Dickey & Pierce, P.L.C.

(57) ABSTRACT

A video encoding method for generating, based on disparity information between an already-encoded reference camera image and an encoding target camera image corresponding to the reference camera image, a disparity-compensated image by means of inter-camera image prediction; and encoding a differential image between the encoding target camera image and the disparity-compensated image. The method includes selecting, for each predetermined section unit on the differential image, one of a decoded differential image group obtained by decoding a differential image between the already-encoded camera image and the disparity-compensated image and a decoded camera image group obtained by decoding the already-encoded camera image, by determining whether or not there is a disparity-compensated image at the corresponding position, that is, whether or not the corresponding pixel in the disparity-compensated image has an effective value.

14 Claims, 9 Drawing Sheets

(51) Int. Cl.

| | | |
|---|---|---|
| *H04N 19/176* | (2014.01) | |
| *H04N 19/147* | (2014.01) | |
| *H04N 19/61* | (2014.01) | |
| *H04N 19/146* | (2014.01) | |
| *H04N 19/182* | (2014.01) | |
| *H04N 19/19* | (2014.01) | |
| *H04N 19/573* | (2014.01) | |

(52) U.S. Cl.
CPC ............. *H04N19/147* (2014.11); *H04N 19/61* (2014.11); *H04N 19/146* (2014.11); *H04N 19/182* (2014.11); *H04N 19/19* (2014.11); *H04N 19/573* (2014.11)

(56) References Cited

U.S. PATENT DOCUMENTS

| | | | |
|---|---|---|---|
| 2007/0041443 A1* | 2/2007 | Ha et al. | 375/240.15 |
| 2007/0064800 A1* | 3/2007 | Ha | 375/240.12 |
| 2007/0147502 A1* | 6/2007 | Nakamura | 375/240.12 |
| 2007/0189396 A1* | 8/2007 | Kitahara et al. | 375/240.26 |
| 2009/0010323 A1* | 1/2009 | Su et al. | 375/240.01 |

FOREIGN PATENT DOCUMENTS

| | | |
|---|---|---|
| JP | 10-191393 A | 7/1998 |
| JP | 10-191394 A | 7/1998 |
| JP | 2003-009179 A | 1/2003 |
| RU | 2 168 192 C2 | 5/2001 |
| RU | 2 237 283 C2 | 9/2004 |
| WO | 98/21690 A1 | 5/1998 |
| WO | 2005/018217 A2 | 2/2005 |
| WO | 2006/073116 A1 | 7/2006 |

OTHER PUBLICATIONS

Li, Guoping, et al., "A Novel Multi-View Video Coding Scheme Based on H.264," Proceedings of the 2003 Joint Conference of the Fourth International Conference on Information, Communications and Signal Processing and Fourth Pacific Rim Conference on Multimedia, Singapore, Dec. 15-18, 2003, pp. 493-497.

Shimizu, Shinya, et al., "New View Synthesis Prediction Framework Using Residual Prediction," Joint Video Team (JVT) of ISO/IEC MPEG & ITU-T VCEG (ISO/IEC JTC1/SC291WG11 and ITU-T SG16 Q.6), doc. JVT-W087, 23rd Meeting: San Jose, California, Apr. 21-27, 2007.

Moellenhoff, Mark S., et al., "Characteristics of disparity-compensated stereo image pair residuals," Signal Processing: Image Communication, vol. 14, Nov. 6, 1998, pp. 55-69.

ITU-T Rec.H.264/ISO/IEC 11496-10, "Editor's Proposed Draft Text Modifications for Joint Video Specification (ITU-T Rec. H.264/ISO/IEC 14496-10 AVC), Draft 7", Final Committee Draft, Document JVT-E022, pp. 10-13, and 62-68, Sep. 2002.

Shinya Shimizu, Masaki Kitahara, Kazuto Kamikura and Yoshiyuki Yashima, "Multi-view Video Coding based on 3-D Warping with Depth Map", In Proceedings of Picture Coding Symposium 2006, SS3-6, Apr. 2006.

* cited by examiner

VIDEO ENCODING METHOD AND DECODING METHOD, APPARATUSES THEREFOR, PROGRAMS THEREFOR, AND STORAGE MEDIA WHICH STORE THE PROGRAMS

TECHNICAL FIELD

The present invention relates to encoding and decoding techniques for multi-viewpoint video images.

Priority is claimed on Japanese Patent Application No. 2006-353628, filed Dec. 28, 2006, the contents of which are incorporated herein by reference.

BACKGROUND ART

Multi-viewpoint video images are a plurality of video images obtained by photographing the same object and background thereof using a plurality of cameras. Below, a video image obtained by a single camera is called a "two-dimensional video image", and a set of multiple two-dimensional video images obtained by photographing the same object and background thereof is called a "multi-viewpoint video image".

There is a strong temporal correlation in the two-dimensional video image of each camera, which is included in a multi-viewpoint video image. In addition, when the cameras are synchronized with each other, the images (taken by the cameras) at the same time capture the object and background thereof in entirely the same state from different positions, so that there is a strong correlation between the cameras. The encoding efficiency of video encoding can be improved using this correlation.

First, conventional techniques relating to the encoding of two-dimensional video images will be shown.

In many known methods of encoding two-dimensional video images, such as H. 264, MPEG-2, MPEG-4 (which are international encoding standards), and the like, highly efficient encoding is performed by means of motion compensation, orthogonal transformation, quantization, entropy encoding, or the like. For example, in H.264, it is possible to perform encoding using temporal correlation between the present frame and past or future frames.

Non-Patent Document 1 discloses detailed techniques of motion compensation used in H. 264. General explanations thereof follow.

In accordance with the motion compensation in H. 264, an encoding target frame is divided into blocks of any size, and each block can have an individual motion vector, thereby achieving a high level of encoding efficiency even for a local change in a video image.

In addition, as candidates for a reference image, past or future frames (with respect to the present frame), which have already been encoded, may be prepared so that each block can have an individual reference frame, thereby implementing a high level of encoding efficiency even for a video image in which an occlusion occurs due to a temporal change.

Next, a conventional encoding method of multi-viewpoint video images will be explained. As the encoding of multi-viewpoint video images uses a correlation between cameras, the multi-viewpoint video images are highly efficiently encoded in a known method which uses "disparity compensation" in which motion compensation is applied to images obtained by different cameras at the same time. Here, disparity is the difference between positions, to which the same point on an imaged object is projected, on the image planes of cameras which are disposed at different positions.

Figure 7:
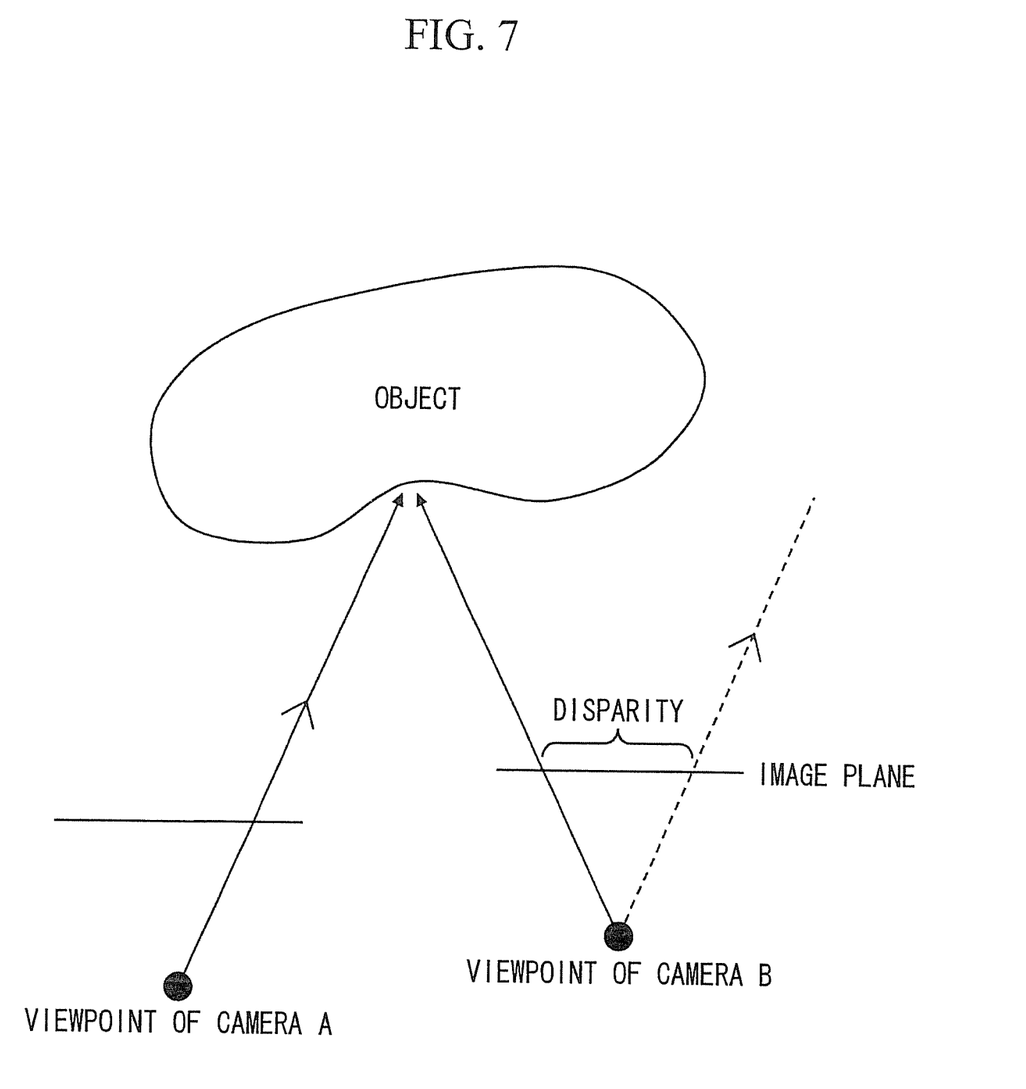
FIG. 7 is a schematic diagram showing the concept of disparity generated between cameras.

FIG. 7 is a schematic view showing the concept of disparity generated between such cameras. That is, FIG. 7 shows a state in which an observer looks down on image planes of cameras A and B, whose optical axes are parallel to each other, from the upper side thereof. Generally, such points, to which the same point on an imaged object is projected, on image planes of different cameras, are called "corresponding points". In encoding based on disparity compensation, based on the above corresponding relationship, each pixel value of an encoding target frame is predicted using a reference frame, and the relevant prediction residual and disparity information which indicates the corresponding relationship are encoded.

For each frame in a multi-viewpoint video image, temporal redundancy and redundancy between cameras are present at the same time. Non-Patent Document 2 and Patent Document 1 (disclosing a multi-viewpoint image encoding apparatus) each disclose a method for removing both redundancies simultaneously.

In the relevant methods, temporal prediction of a differential image between an original image and a disparity-compensated image is performed, and a residual of motion compensation in the differential image is encoded.

In accordance with such methods, temporal redundancy, which cannot be removed by a disparity compensation for removing the inter-camera redundancy, can be removed using the motion compensation. Therefore, a prediction residual, which is finally encoded, is reduced, so that a high level of encoding efficiency can be achieved.

Non-Patent Document 1: ITU-T Rec. H.264/ISO/IEC 11496-10, "Editor's Proposed Draft Text Modifications for Joint Video Specification (ITU-T Rec. H.264/ISO/IEC 14496-10 AVC), Draft 7", Final Committee Draft, Document JVT-E022, pp. 10-13, and 62-68, September 2002.

Non-Patent Document 2: Shinya SHIMIZU, Masaki KITAHARA, Kazuto KAMIKURA and Yoshiyuki YASHIMA, "Multi-view Video Coding based on 3-D Warping with Depth Map", In Proceedings of Picture Coding Symposium 2006, SS3-6, April, 2006.

Patent Document 1: Japanese Unexamined Patent Application, First Publication No. H10-191393.

DISCLOSURE OF INVENTION

Problem to be Solved by the Invention

In accordance with the conventional multi-viewpoint video encoding method applying motion compensation to a differential image, the prediction residual in a part having both the temporal and inter-camera redundancies can be reduced, so that encoding can be efficiently performed.

Figure 8:
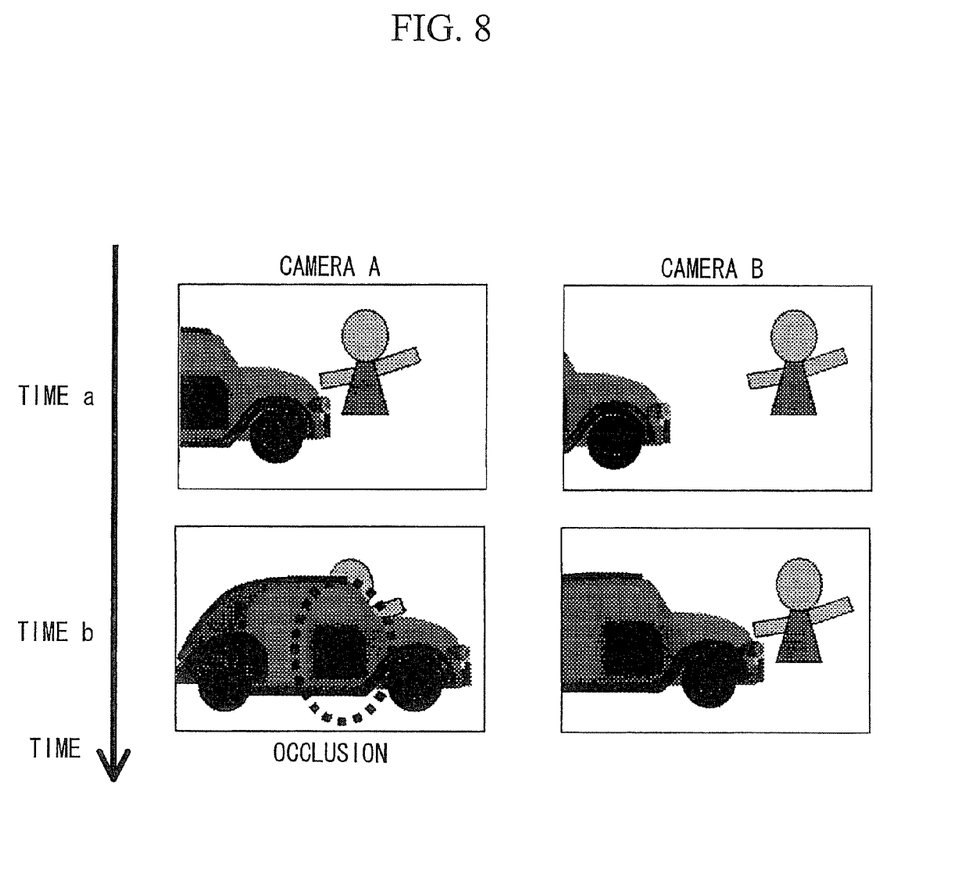
FIG. 8 is a diagram showing an example in which an occlusion occurs between imaged objects.

However, if an occlusion occurs between imaged objects as shown in FIG. 8, then presence/absence of inter-camera redundancy for a single object may change depending on time.

FIG. 8 shows an example of inter-object occlusion in images which are obtained by cameras A and B at each of times a and b.

Figure 9:
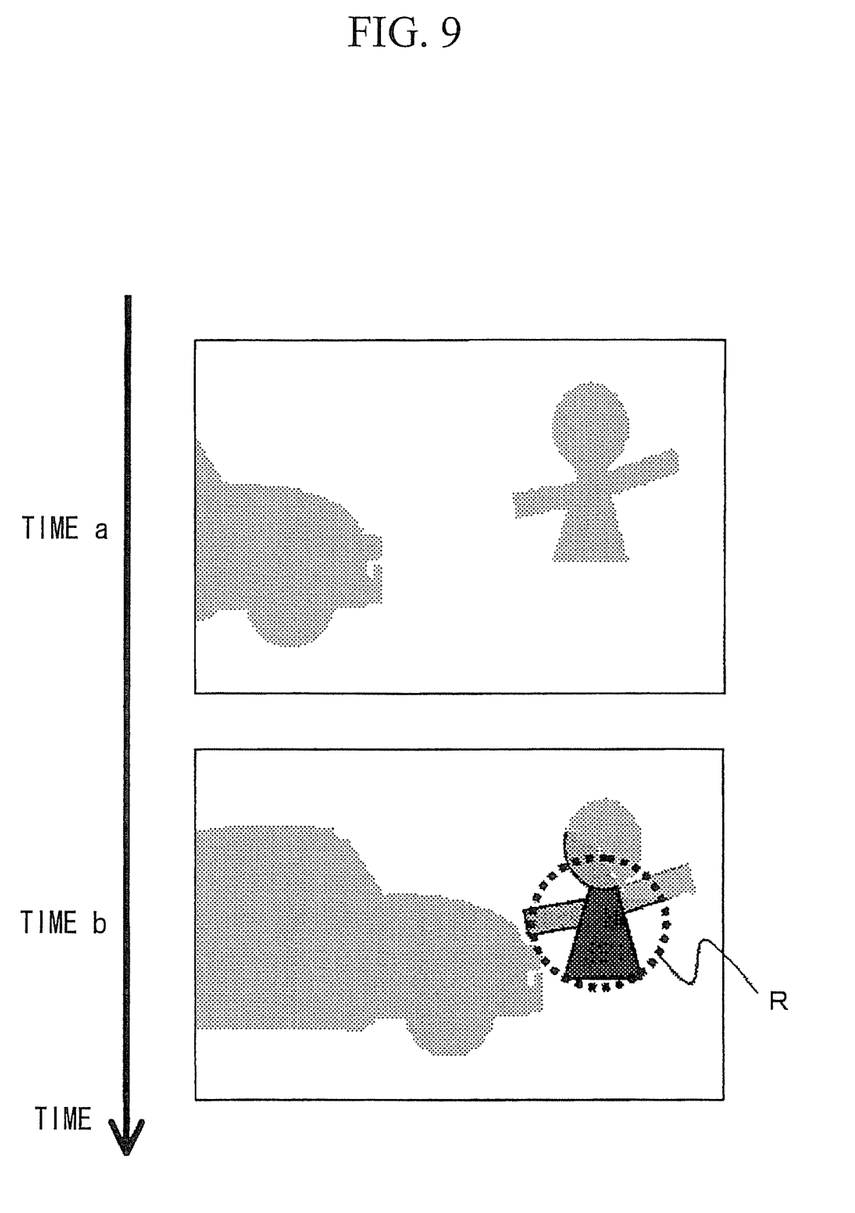
FIG. 9 is a diagram showing an example of the residual image of disparity compensation when there is an occlusion.

FIG. 9 shows an example of the residual image of disparity compensation when there is an occlusion.

In accordance with the method disclosed in Non-Patent Document 2, to each pixel of a reference frame used in disparity compensation, disparity information which indicates a corresponding point in another frame is provided. Therefore, if the image of camera B is disparity-compensated from the image of camera A (see FIG. 8), a differential image as shown in FIG. 9 is obtained.

In FIG. 9, the color depth indicates the value of the differential signal, so that the closer to white, the smaller the relevant difference.

Here, disparity information, which indicates to which part in the image of camera B each pixel in the reference frame (i.e., the image of camera A) corresponds, is used. Therefore, no disparity compensation is performed at each part which is present in the image of camera B but is not present in the image of camera A. Accordingly, the color of each part (in the relevant image) for which a corresponding point can be obtained becomes close to white. In contrast, in part R (inside a dotted circle in FIG. 9) for which no corresponding point can be obtained, the original image remains unchanged as the differential signal.

However, due to a difference in sensitivity between the cameras or an influence of reflection, the differential signal does not completely become zero even in each part for which a corresponding point can be obtained. In an area such as R in FIG. 9, it is obvious that the prediction residual cannot be reduced even by motion compensation performed from a differential image at another time such as time a in FIG. 9.

In a simple method for solving the above problem, each block refers to a different frame. That is, as the reference frame, not only the decoded image of the differential image, but also the decoded image of a final camera image obtained by adding a disparity-compensated image to the differential image can be used, and one of the two decoded images can be switchably referred to in each block.

Accordingly, even in the area R in FIG. 9 where the original camera image remains, the prediction residual can be reduced by performing motion compensation from the decoded image of the camera image.

However, in such a method, it is necessary to encode information for indicating the reference frame of each block, which causes an increase in the amount of code.

In addition, the above method is ineffective if a part having an occlusion and a part having no occlusion are simultaneously present in a block.

On the other hand, in the method disclosed in Non-Patent Document 1, when encoding an encoding target frame, instead of encoding the entire frame by subjecting the differential image to motion compensation, it is possible to select for each block whether (i) the differential image is subjected to motion compensation, (ii) only disparity compensation is performed, or (iii) only motion compensation is performed.

Accordingly, even in a part where an occlusion occurs between the cameras, the prediction residual can be efficiently reduced if there is temporal redundancy.

However, in the above method, it is necessary to encode information for indicating which prediction method was used in each block, that is, to encode a large amount of additional information although the prediction residual can be reduced. Therefore, it is impossible to achieve a high level of encoding efficiency.

Furthermore, as only one prediction method can be selected in each block, the relevant method is ineffective if the presence/absence of occlusion is not fixed in each part of a block.

In light of the above circumstances, an object of the present invention is to provide novel video encoding and decoding techniques for achieving a high level of encoding efficiency by implementing an appropriate prediction without increasing the amount of code required for the prediction.

Means for Solving the Problem

In order to solve the above problems, the present invention provides a video encoding method for generating, based on disparity information between an already-encoded reference camera image and an encoding target camera image corresponding to the reference camera image, a disparity-compensated image by means of inter-camera image prediction; and encoding a differential image between the encoding target camera image and the disparity-compensated image. The method has a step of selecting, for each predetermined section unit (e.g., each pixel) on the differential image, one of the following two image groups as a reference target, by determining whether or not there is a disparity-compensated image at the corresponding position, in other words, whether or not the corresponding pixel in the disparity-compensated image has an effective value:

(i) a decoded differential image group, which is obtained by decoding a differential image between the already-encoded camera image and the disparity-compensated image (i.e., a set of decoded differential images which include a decoded differential image which was obtained at another time and has been already encoded, or a decoded differential image of an already-encoded part of the differential image for the encoding target camera image); and (ii) a decoded camera image group, which is obtained by decoding the already-encoded camera image (a set of decoded camera images which are each represented by the sum of each decoded differential image (which may be a decoded differential image at another time) and a corresponding disparity-compensated image).

In accordance with the above method, predictive encoding using an appropriate reference image for each desired section unit can be performed without adding new additional information about selection for the mode or reference image. That is, it is possible to reduce the residual element to be encoded, without increasing the amount of code required for the additional information, thereby implementing a high level of encoding efficiency.

In the above method, the disparity information may be provided as a disparity vector, or represented as geometrical information such as a distance from the camera to the imaged object, that is, it may be provided in any format by which corresponding relationships between the relevant images can be obtained.

When encoding the differential image using a designated reference target, the encoding may be performed using a signal prediction method in one encoding processing block.

In general predictive encoding, different reference targets probably have different optimum prediction methods. Therefore, if one encoding processing block includes pixels or areas which have different reference targets, the prediction method is selected for each reference target, and additional information which indicates a plurality of prediction methods is encoded.

However, if encoding is performed using a single prediction method in one encoding processing block, as described above, information which indicates only one prediction method should be encoded for each encoding processing block, thereby reducing the amount of code required for the entire encoding. In this case, for an anticipated degradation in the prediction efficiency, the prediction efficiency should not be considerably degraded in consideration of a case as shown in FIG. 9, that is, when performing video prediction by applying a single method (i.e., motion compensation using a single motion vector) even to a boundary part.

Additionally, in consideration of the balance between the prediction efficiency and the amount of code required for the additional information, it is possible to select whether a single prediction method is used in each block, or an individual prediction method is assigned to each reference target. When considering such balance between the prediction efficiency and the amount of code required for the additional information, it is possible to implement more flexible encoding having a higher level of encoding efficiency.

In this case, the decoding side can determine from encoded data whether or not the prediction method has been switched, so that the decoding side can appropriately decode the relevant image.

Effect of the Invention

In accordance with the present invention, when subjecting a differential image obtained by disparity compensation to predictive encoding, no new additional information is used, and an appropriate reference image is used through a switching operation for each pixel. Therefore, the residual for the encoding target can be reduced without increasing the amount of code required for the additional information, thereby implementing efficient video encoding of the entire multi-viewpoint video image.

REFERENCE SYMBOLS 100 video encoding apparatus
101 image input unit
102 reference image input unit
103 disparity information input unit
104 disparity-compensated image generator
105 differential image predictive encoder
106 reference image setting unit
107 decoded camera image memory
108 decoded differential image memory
109 reference switch
110 differential image decoder
200 video decoding apparatus
201 encoded data input unit
202 reference image input unit
203 disparity information input unit
204 disparity-compensated image generator
205 reference image setting unit
206 decoded camera image memory
207 decoded differential image memory
208 reference switch
209 differential image decoder

BEST MODE FOR CARRYING OUT THE INVENTION

Prior to the explanation of embodiments of the present invention, a summary of the present invention will be described.

In conventional techniques for multi-viewpoint encoding, it is necessary to encode and transmit information which indicates the selected image. In contrast, the present invention is characterized in that the information which indicates the selected image can be decoded using other information. Accordingly, when the present invention has the same amount of code as conventional techniques, the present invention has better image quality in comparison with the conventional techniques.

In order to encode a multi-viewpoint video image, if a difference between a video image obtained by a camera and a corresponding image generated by means of disparity compensation from another camera is obtained, and encoding is performed in consideration of temporal correlation with respect to the differential video image, then in conventional techniques, an occlusion part such as R in FIG. 9 cannot be efficiently encoded.

In contrast, in the present invention, an occlusion part such as R in FIG. 9 can be efficiently encoded by subjecting the relevant part to predictive encoding which using, not a differential video image from an image generated by disparity compensation, but a decoded image of the original video image.

Additionally, in an easily anticipated method for solving a problem such that the occlusion part cannot be efficiently encoded, a multi-frame referring technique employed in H.264 is used so that predictive encoding is performed by assigning an individual reference image to each block.

However, in such a case, (i) information for designating a reference image for each block is encoded, which causes an increase in the amount of code, and (ii) switching of the reference image can be performed only by a block unit. Therefore, the relevant method is ineffective when a block has both an occlusion part and a non-occlusion part.

In contrast, in the present invention, switching of the reference image is performed using information obtained when generating an image by disparity compensation. Therefore, it is unnecessary to encode new information. Furthermore, in accordance with the used information, presence/absence of occlusion can be determined for each pixel. Therefore, switching of the reference image can be performed by a pixel unit.

In order to implement the above functions, in the present invention, information Ref which indicates whether or not a disparity-compensated image Syn of an encoding target can be generated using an image obtained by another camera is generated, and switching of the reference image is performed using the information Ref.

A determination result that a disparity-compensated image Syn can be generated means that the same object appears in an image of another camera, and thus no occlusion has occurred.

In contrast, a determination result that a disparity-compensated image Syn cannot be generated means that the same object does not appear in an image of another camera, and thus an occlusion has occurred.

That is, switching of the reference image is performed using information which indicates whether or not a disparity-compensated image Syn can be generated, so that it is possible to solve the problem that no appropriate prediction can be performed in an occlusion part such as R in FIG. 9.

The multi-frame referring technique used in H.264 is also known as a method for selecting a reference image used for encoding from among a plurality of reference image candidates. In this known method, it is necessary to encode and transmit information that indicates which image was selected.

In contrast, in the present invention, information used for selecting a reference image is generated using information which is used for generating a disparity-compensated image and which must be transmitted also when using the above known method. Therefore, it is unnecessary to transmit additional information used for switching the reference image, thereby reducing the amount of code.

In the embodiments shown later, information which is used for selecting a reference image and is generated based on information used for generating a disparity-compensated image is represented as information Ref, and the same information can be used on the encoding and decoding sides (for example, information on the encoding side is generated in step A6 in FIG. 2, and information on the decoding side is generated in step C4 in FIG. 5).

Additionally, If the reference image is selected for each pixel in a known method such as the multi-frame referring technique in H.264 or the like, the amount of code required for a prediction error signal to be encoded can be reduced. However, in such a case, it is necessary to encode information used for switching the reference image for each pixel, which causes an increase in the amount of code. That is, in this case, the reference image can be switched only by a block unit so as to reduce the total amount of code.

In contrast, in the present invention, the information for switching the reference image is not one to be additionally transmitted as described above. Therefore, when generating such information in correspondence to each pixel, switching of the reference image for each pixel can be performed without increasing the amount of code, thereby reducing the amount of code required for the prediction error signal.

Below, the present invention will be explained in detail in accordance with embodiments.

In the embodiments, it is assumed that a multi-viewpoint video image obtained using two cameras is encoded, where the image of camera B is encoded using the image of camera A as the reference image.

Figure 1:
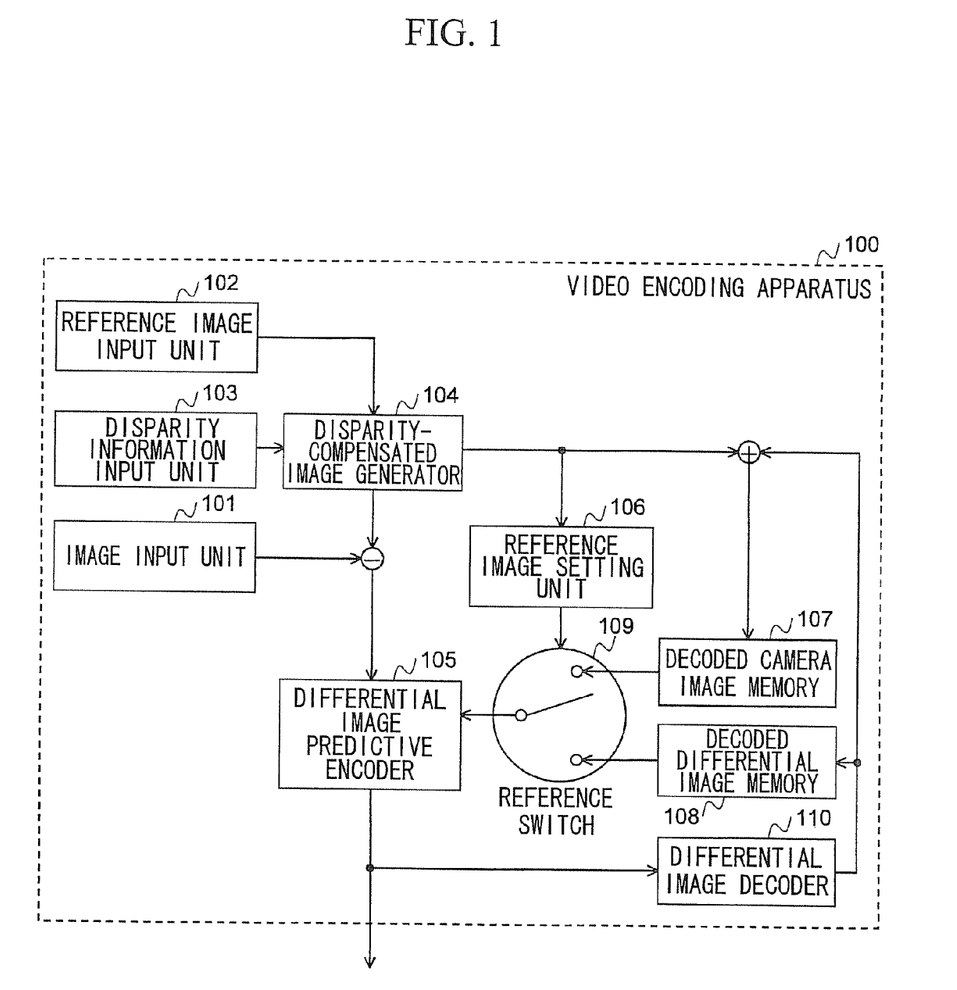
FIG. 1 is a diagram showing a video encoding apparatus as an embodiment of the present invention.

FIG. 1 shows a video encoding apparatus 100 as an embodiment of the present invention.

The video encoding apparatus 100 includes an image input unit 101 for inputting an image (as an encoding target image) obtained by camera B into the apparatus; a reference image input unit 102 for inputting a decoded image (as a reference image) of camera A into the apparatus; a disparity information input unit 103 for inputting disparity information, which indicates to which position on the encoding target image each pixel in the reference image corresponds, into the apparatus; a disparity-compensated image generator 104 for generating a disparity-compensated image at the position of camera B by using the reference image and the disparity information; a differential image predictive encoder 105 for subjecting a differential image between the encoding target image and the disparity-compensated image to predictive encoding; a reference image setting unit 106 for assigning a reference image group to each pixel based on the state of the disparity-compensated image; a decoded camera image memory 107 for storing decoded images (as a reference image group) of images obtained by camera B; a decoded differential image memory 108 for storing decoded images (as another reference image group) of the encoded differential images; a reference switch 109 for switching the reference image memory based on setting information about the reference image group; and a differential image decoder 110 for decoding each encoded differential image.

Figure 2:
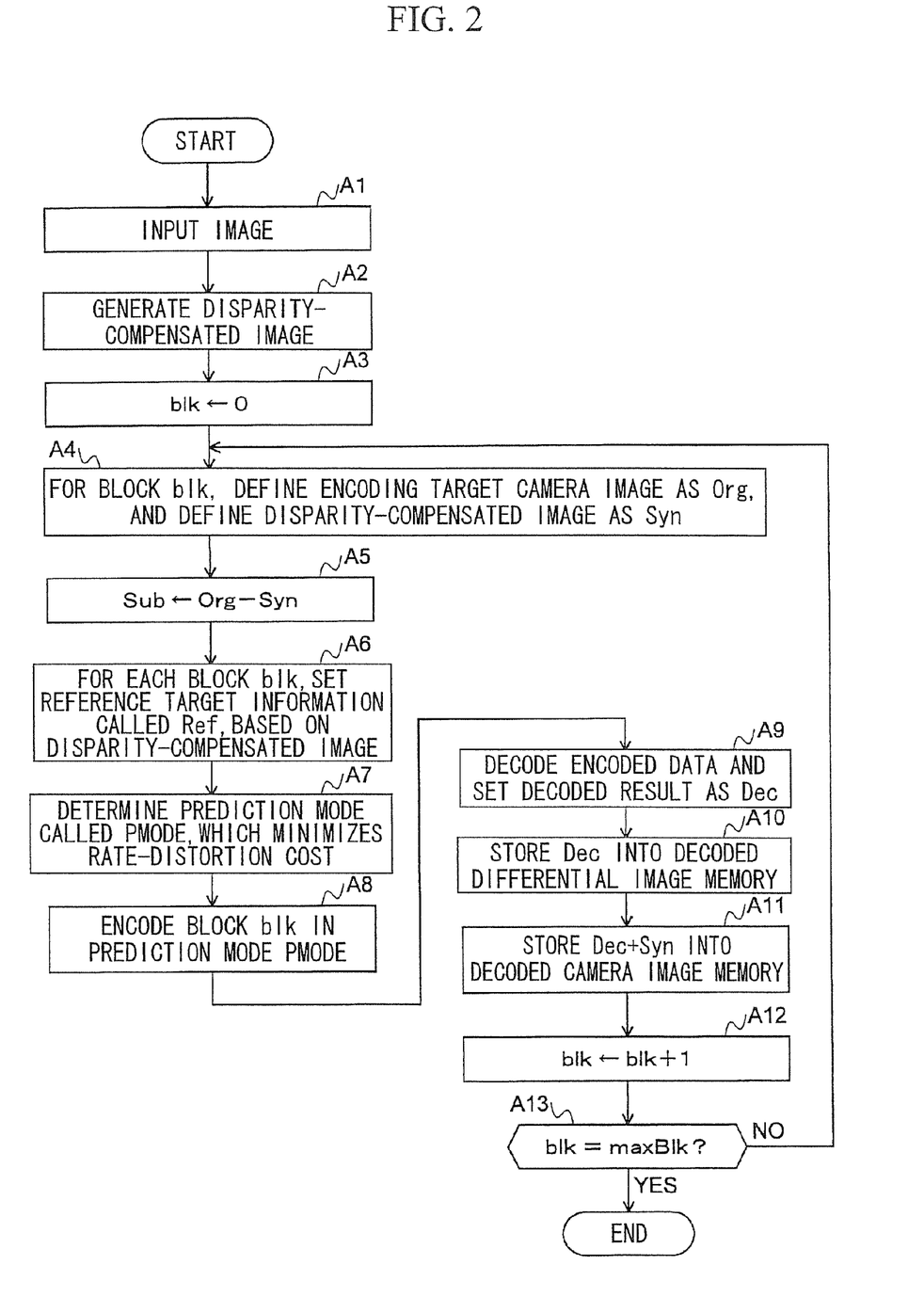
FIG. 2 is a video encoding flowchart performed in the embodiment.
Figure 3:
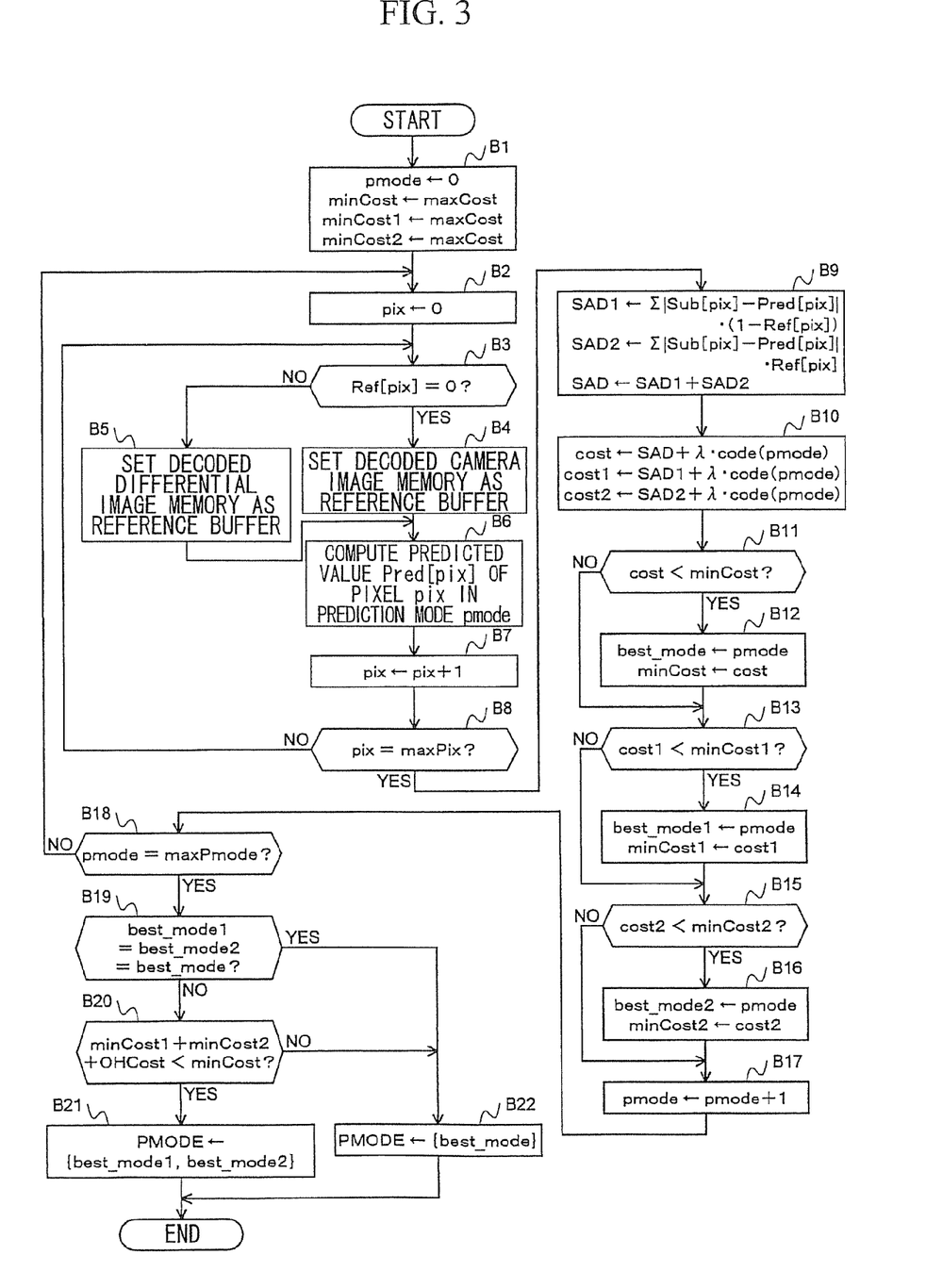
FIG. 3 is a detailed flowchart for the prediction mode determination in the embodiment.

FIGS. 2 and 3 are flowcharts executed by the video encoding apparatus 100 having the above structure. Referring to the flowcharts, the operation performed by the video encoding apparatus 100 will be explained in detail.

As shown in the operation flow in FIG. 2 which shows the general encoding operation, an image of camera B is input by the image input unit 101 into the video encoding apparatus 100 (see step A1).

Here, a decoded image of camera A, which has the same display time (i.e., the same imaging time) as the input image of camera B, is input by the reference image input unit 102, and disparity information between the images at the relevant time is input by the disparity information input unit 103.

Below, the input image of camera B is called an "encoding target camera image", and the decoded image of camera A is called a "reference camera image"

Based on the reference camera image input by the reference image input unit 102 and the disparity information input by the disparity information input unit 103, a disparity-compensated image is generated by the disparity-compensated image generator 104 (see step A2).

The disparity-compensated image generation is performed in a manner such that the pixel value of each pixel on the reference camera image is used as the pixel value of a corresponding pixel on the disparity-compensated image.

In this process, if a plurality of points on the reference camera image correspond to the same point on the disparity-compensated image, then front-to-back relationships between imaged objects are determined, and the pixel value of a point on an imaged object closest to the camera is used. For example, if the cameras have parallel optical axes, it is possible to determine that the larger the disparity, the closer the relevant point to the camera.

In addition, as the disparity information indicates a corresponding point on the encoding target camera image to each pixel on the reference camera image, there is no disparity-compensated image for a part which is absent in the reference camera image.

By using the disparity-compensated image obtained above, the encoding target camera image is encoded for each encoding processing block (see steps A3 to A13).

In the current flow, "blk" is an index for each block, and maxBlk indicates the total number of blocks in an image. That is, after blk is initialized to zero (see step A3), the following process (steps A4 to A11) is repeatedly performed while blk is incremented by 1 (see step A12), until blk reaches the total number maxBlk of blocks (see step A13).

First, it is defined for block blk that Org indicates the encoding target camera image and Syn indicates the disparity-compensated image (see step A4). The difference Org−Syn is computed for each pixel belonging to block blk, so that a differential image Sub is generated (see step A5).

For each pixel part having no disparity-compensated image, the pixel value of Syn is set to 0 when computing the differential image.

Next, the reference image setting unit 106 sets information Ref, which indicates a reference used when subjecting the differential image of each pixel in block blk to predictive encoding as shown below (see step A6).

$\forall \text{pix} \in \{0, 1, \ldots, \text{maxPix}-1\}$

Ref[pix]=0 when no disparity-compensated image is stored in Syn[pix]

Ref[pix]=1 when a disparity-compensated image is stored in Syn[pix]

where pix is an index indicating each pixel in block blk, maxPix indicates the total number of pixels in block blk. In addition, block unit information to which "[pix]" is appended indicates information of the pixel at the position of pixel index pix.

Additionally, although any method can be used for determining whether a disparity-compensated image is set as Syn so as to generate Ref, an example thereof will be shown below.

Before generating the disparity-compensated image Syn, the pixel value of each pixel is initialized at an absolutely unattainable value (e.g., −1). The disparity-compensated image Syn is generated by updating the pixel value in a manner such that the pixel value of each pixel in the reference camera image is determined as the pixel value at the corresponding position on the disparity-compensated image. Ref is then generated in a manner such that if Syn assigned to each pixel is −1, Ref is set to 0, and that if Syn has a value other than −1, Ref is set to 1. Accordingly, the target Ref can be generated in one-to-one correspondence to Syn.

In the above method, in the computation of the differential image Sub in the above-described step A5, in each part where Syn is −1, the pixel value is regarded as 0 and Sub is set to the value of Org.

In another method, before computing the differential image Sub, Ref is generated in accordance with the above-described method or the like; in each part where Syn is −1, Syn is rewritten as 0; and then the differential image Sub is computed by computing Org−Syn.

Here, for convenience of explanations, the total Syn, which also includes each part where no disparity-compensated image is present and the pixel value is regarded as 0, is called the disparity-compensated image.

Next, a prediction mode, which provides the minimum rate-distortion cost when subjecting the differential image Sub to predictive encoding by using the above Ref, is obtained and set as PMODE (see step A7).

When "sad" is the sum of absolute values of prediction errors in a prediction mode, and "bin" is a predicted value of the amount of code required for encoding information which indicates the prediction mode, the rate-distortion cost called "cost" is computed by the following formula, where λ is an undefined Lagrange multiplier and is a predetermined value.

$$cost = sad + \lambda \cdot bin$$

By using the above-determined PMODE, the differential image Sub of block blk is actually subjected to predictive encoding (see step A8).

The prediction mode determination and the actual encoding are performed in the differential image predictive encoder 105. The encoding result includes, not only encoded data of the relevant image, but also encoded data of information (e.g., PMODE) required for the encoding.

The encoding result is output from the video encoding apparatus 100, and also decoded in the differential image decoder 110 (see step A9).

Here, Dec indicates the decoded image of the differential image Sub of block blk, and is stored in the decoded differential image memory 108 so as to use Dec in intraframe prediction performed when encoding another block or interframe prediction performed when encoding a frame at another time (see step A10).

In addition, the decoded camera image of block blk is generated by computing the sum of Dec and Syn, and is stored into the decoded camera image memory 107 (see step A11).

The above-described operation is applied to each block.

FIG. 3 shows a detailed operation flow of the prediction mode determination process (step A7) performed in the differential image predictive encoder 105.

In the operation flow, a rate-distortion cost called "cost" indicated by the following formula is computed for each prediction mode, and a prediction mode which provides the minim value is determined.

$$cost = SAD + \lambda \cdot code(pmode)$$

where SAD is the sum of absolute differences for each pixel between the predicted image and the original image; pmode indicates a prediction mode index; and code(α) is a function which returns a predicted value of the amount of code required for representing information about the provided prediction mode α.

As shown in the operation flow, after the prediction mode index pmode is initialized to zero (see step B1), the following process (steps B2 to B16) is repeatedly performed while pmode is incremented by 1 (see step B17), until pmode reaches the number "maxPmode" of prediction modes (see step B18), thereby determining a prediction mode which minimizes "cost".

In the following process, each prediction mode is estimated using a rate-distortion cost, where maxCost is defined as the maximum value which is unattainable as the estimated value. Furthermore, in order to perform repetitious estimation, the best estimated values at the individual conditions explained below are respectively indicated by minCost, minCost1, and minCost2, and prediction mode indexes assigned thereto are respectively indicated by best_mode, best_mode1, and best_mode2.

The variables minCost and best_mode represent the best estimated value and the corresponding prediction mode index when predicting all pixels in the relevant block; the variables minCost1 and best_mode1 represent the best estimated value and the corresponding prediction mode index when predicting only pixels whose corresponding Ref has a value of 0; and the variables minCost2 and best_mode2 represent the best estimated value and the corresponding prediction mode index when predicting only pixels whose corresponding Ref has a value of 1.

After initializing each of minCost, minCost1, and minCost2 at maxCost (see step B1), a predicted image for prediction mode pmode is generated for each pixel (see steps B2 to B8).

In the predicted image generation, after pixel index "pix" in the relevant block is initialized to zero (see step B2), the following process (steps B3 to B6) is repeatedly performed while pix is incremented by 1 (see step B7), until pix reaches the number "maxPix" of pixels in the block (see step B8), thereby determining a prediction mode which minimizes "cost".

First, in accordance with Ref[pix], it is determined whether or not there is a disparity-compensated image at the corresponding pixel (see step B3).

If no disparity-compensated image is present, the reference switch 109 is operated so that the differential image predictive encoder 105 refers to the decoded camera image memory 107 (see step B4). In contrast, if there is a disparity-compensated image, the reference switch 109 is operated so that the differential image predictive encoder 105 refers to the decoded differential image memory 108 (see step B5).

Then by using the set reference image, a predicted value Pred[pix] for the relevant pixel is computed in the prediction mode pmode (see step B6).

After the predicted image generation is completed for all pixels in the block, three types of the sum of absolute differences between the predicted image and the original image are computed by the following formulas.

$$SAD1 = \Sigma |Sub[pix] - Pred[pix]| \cdot (1 - Ref[pix])$$

$$SAD2 = \Sigma |Sub[pix] - Pred[pix]| \cdot Ref[pix]$$

$$SAD = SAD1 + SAD2$$

where SAD1 indicates the sum of the absolute differences for pixels which each do no have a disparity-compensated image; SAD2 indicates the sum of the absolute differences for pixels which each have a disparity-compensated image; and SAD indicates the sum of the absolute differences for all pixels in the block. In addition, $\Sigma$ indicates computing the total sum for pix=0 to maxPix−1. Although the above formulas employ multiplying operations, the computation of the sum of absolute differences may be implemented using simple branch on condition because pixels for computing SAD1 and SAD2 are exclusive for each other.

By using the above SAD, SAD1, SAD2, and pmode, rate-distortion costs called cost, cost1, and cost2 are computed in accordance with the above-described formula (see step B10).

The computed results are respectively compared with the best rate-distortion costs which have already been computed (see steps B11, B13, and B15). For each case, if the prediction mode pmode can realize a smaller cost, the variable which indicates the best prediction mode and the best cost value are updated (see steps B12, B14, and B16).

After estimation of all prediction modes is completed, it is determined whether different prediction modes are assigned to each pixel having a disparity-compensated image and each pixel having no disparity compensation, or the same prediction mode is assigned to all pixels (see steps B19 to B21).

First, it is determined whether or not best_mode, best_mode1, and best_mode2 are all the same (see step B19).

If all of the above elements are the same, it indicates that a single mode can be used in the block, and thus best_mode is stored as the prediction mode PMODE used in predictive encoding (see step B22). The operation is then terminated.

If at least one of three indicates a different mode, then the sum of minCost1, minCost2, and OHCost is compared with minCost (see step B20).

Here, the former (sum) indicates the cost required when different modes are used in the relevant block, and OHCost represents an overhead cost in consideration that two prediction modes are encoded.

If the former provides a better cost, the set of best_mode1 and best_mode2 is stored as PMODE (see step B21). The operation is then terminated.

If the latter provides a better cost, best_mode is stored as PMODE (see step B22), and the operation is terminated.

In the present embodiment, whether one prediction mode is used or two prediction modes are used in the block is selected.

However, one prediction mode may always be used. In such a case, only "cost" is computed in step B10; steps B13 to B16 and B19 to B22 are omitted; and PMODE can be used instead of best_mode On the other hand, two prediction modes may be always used. In such a case, the SAD computation in step B9, the Cost computation in step B10, and steps B11 to B12, B19 to B20, and B22 are unnecessary; and if the result of the determination in step B18 is YES, the operation proceeds to step B21.

The prediction mode in the present embodiment indicates how to predict the pixel value.

As the prediction method, there are intraframe prediction for predicting the pixel value using a peripheral block which belongs to the same frame as the present block and has already been encoded and decoded, and interframe prediction for predicting the pixel value using another frame which has already been encoded and decoded, and the above-described prediction modes include both methods. A motion vector required in the interframe prediction also functions as a prediction mode. In addition, any method which can predict the pixel value using data which has already been encoded and decoded can function as a prediction mode.

Figure 4:
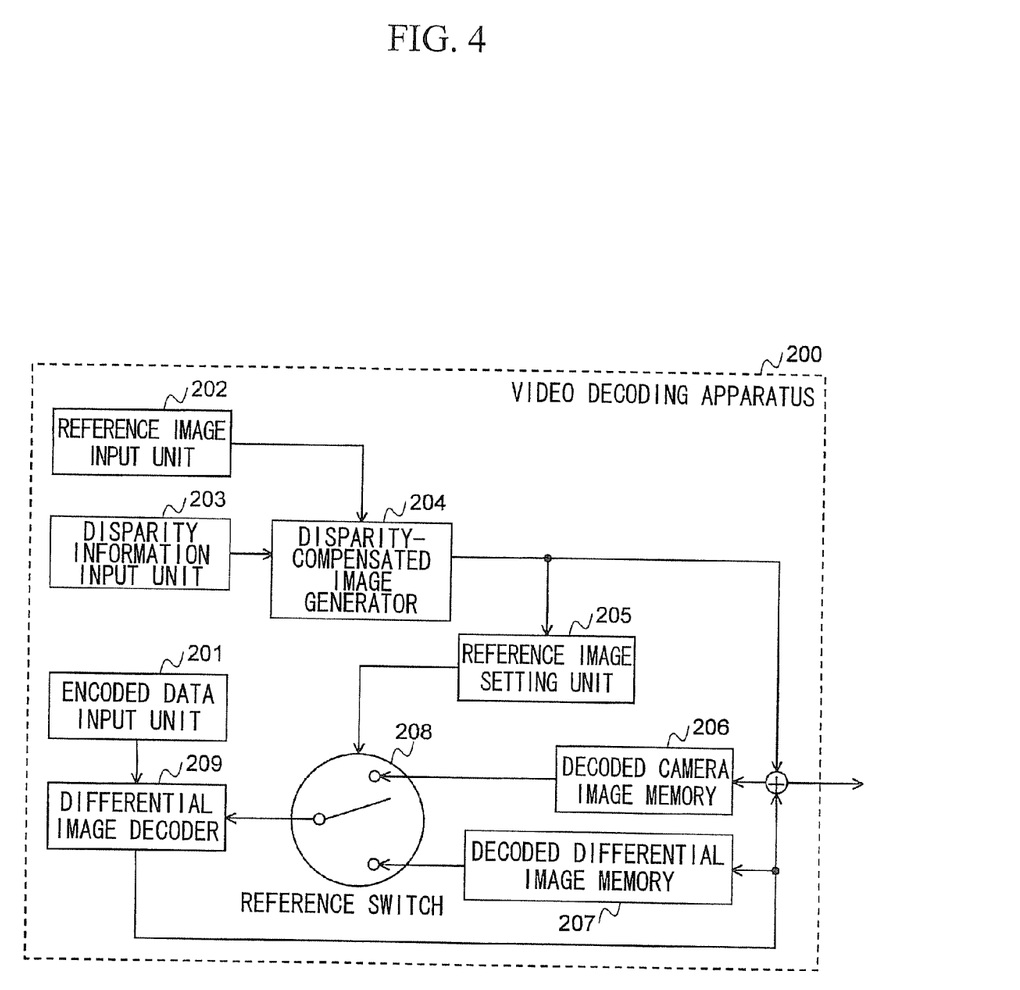
FIG. 4 is a diagram showing a video decoding apparatus as an embodiment of the present invention.

FIG. 4 shows a video decoding apparatus 200 as an embodiment of the present invention.

The video decoding apparatus 200 includes an encoded data input unit 201 for inputting encoded data into the apparatus; a reference image input unit 202 for inputting a decoded image of camera A into the apparatus; a disparity information input unit 203 for inputting disparity information, which indicates to which position on the image as the decoding target each pixel in the decoded image of camera A corresponds, into the apparatus; a disparity-compensated image generator 204 for generating a disparity-compensated image at the position of camera B; a reference image setting unit 205 for assigning a reference image group to each pixel based on the state of the disparity-compensated image; a decoded camera image memory 206 for storing decoded images (as a reference image group) of images obtained by camera B; a decoded differential image memory 207 for storing decoded images (as another reference image group) of the differential images; a reference switch 208 for switching the reference image memory based on setting information about the reference image group; and a differential image decoder 209 for decoding the input encoded data.

Figure 5:
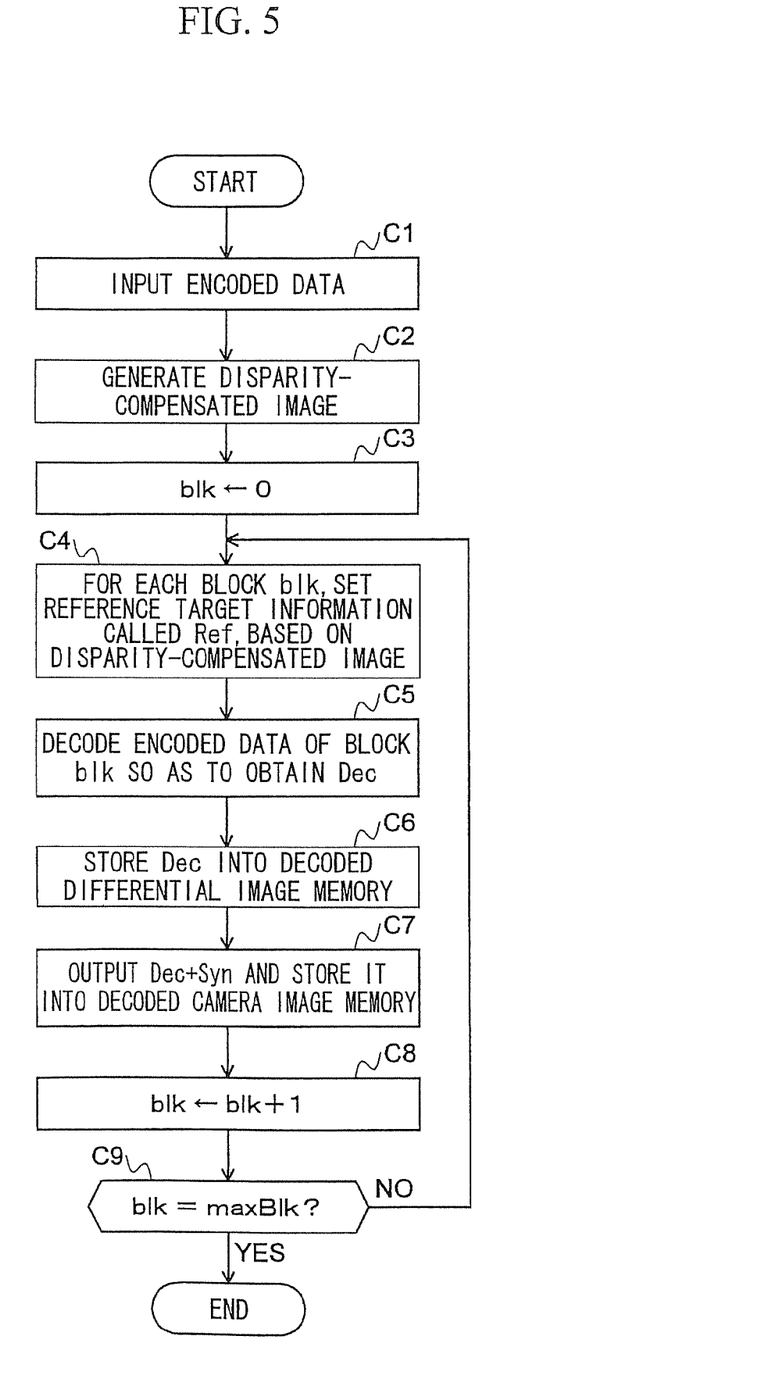
FIG. 5 is a video decoding flowchart performed in the embodiment.
Figure 6:
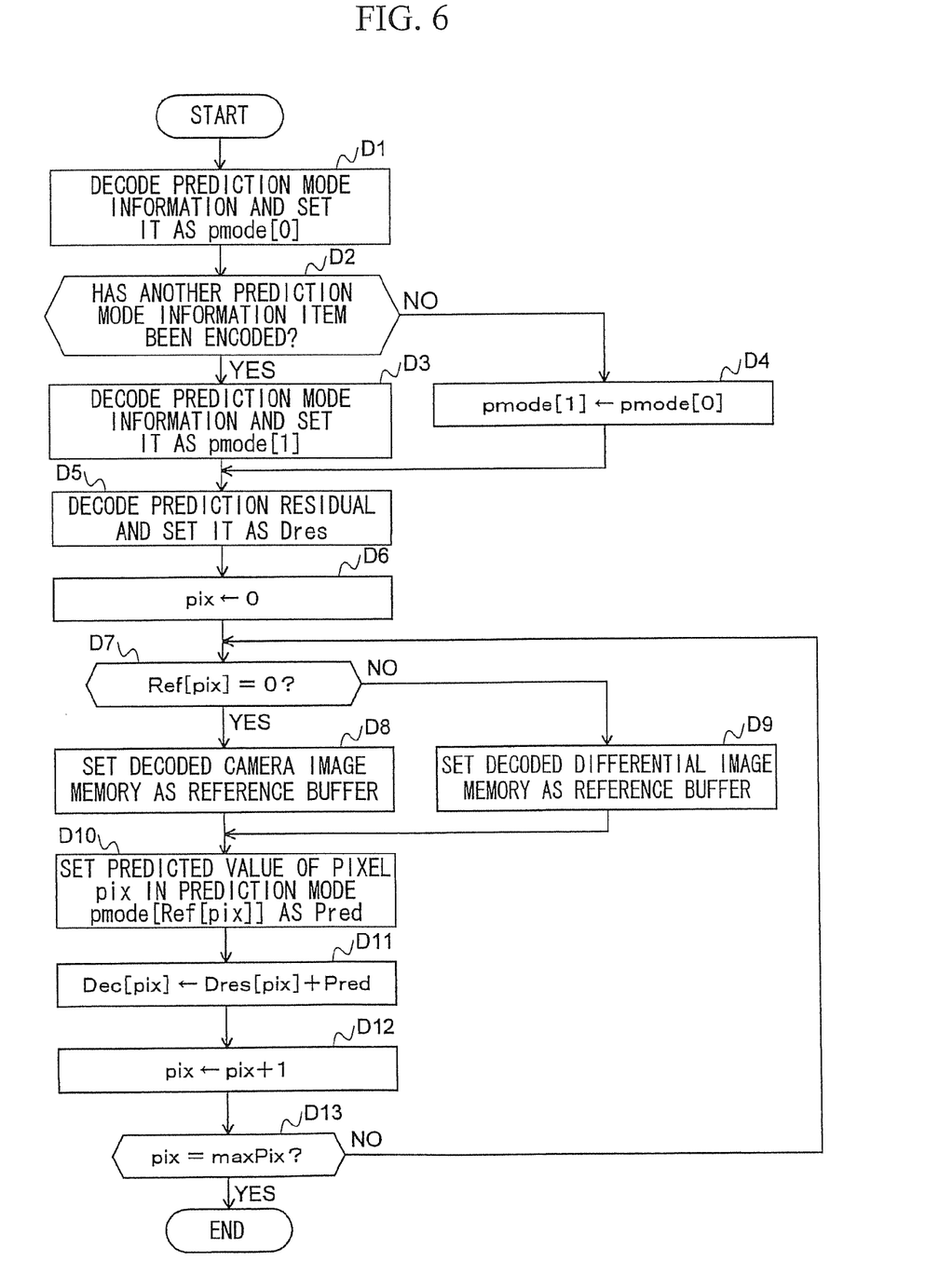
FIG. 6 is a detailed flowchart of the decoding of encoded data for the differential image in the embodiment.

FIGS. 5 and 6 are flowcharts executed by the video decoding apparatus 200 having the above structure, and show an operation flow for decoding one frame of encoded data of camera B. The operation flow will be explained in detail below.

Here, it is assumed that a frame of camera A at the same time as the target decoding frame has been already decoded, and the relevant disparity information has also been obtained.

First, encoded data of camera B is input into the encoded data input unit 201 (see step C1). Here, a decoded image of camera A, which has the same display time as the input image of camera B, is input by the reference image input unit 202.

Next, a disparity-compensated image is generated in the disparity-compensated image generator 204 based on the decoded image of camera A and the disparity information (see step C2). The process in this step is equal to that performed in the above-explained step A2 in FIG. 2.

The encoded data input for each block is decoded using the disparity-compensated image, so that a decoded image of camera B is obtained (see steps C3 to C9).

In this process, "blk" is an index for each block, and max-Blk indicates the total number of blocks in an image. After blk is initialized to zero (see step C3), the following process (steps C4 to C7) is repeatedly performed while blk is incremented by 1 (see step C8), until blk reaches the total number maxBlk of blocks (see step C9).

First, the reference image setting unit 205 generates information Ref for each pixel in block blk in accordance with a method similar to that in the above-described step A6, where Ref indicates a reference used when the differential image was subjected to predictive encoding (see step C4).

The input encoded data is decoded in the differential image decoder 209 by using the above information, so that each decoded value Dec of the differential image is obtained (see step C5).

The decoded value Dec is directly used for decoding a frame at another time or another block, and thus is stored in the decoded differential image memory 207 (see step C6).

In addition, a decoded image of the image obtained by camera B is acquired by computing the sum of Dec and the disparity-compensated image Syn for each pixel in block blk.

The acquired decoded image is output from the video decoding apparatus 200, and is simultaneously stored in the decoded camera image memory 206 (see step C7).

FIG. 6 shows a detailed operation flow of the process (in step C5) of decoding the differential image for each block, which is executed in the differential image decoder 209.

First, prediction mode information is decoded from the encoded data, and is set as pmode[0] (see step D1). In this process, if another prediction mode information item is included in the encoded data (see step D2), the item is also decoded and set as pmode[1] (see step D3). If no another prediction mode information item is included (see step D2), pmode[1] is set to the same value as pmode[0] (see step D4).

Next, the prediction residual for each pixel, which is included in the encoded data, is decoded and set as Dres (see step D5).

The operation after D5 is performed for each pixel in the block. That is, after the pixel index "pix" is initialized to zero (see step D6), the following process (steps D7 to D11) is repeatedly performed while pix is incremented by 1 (see step D12), until pix reaches the number maxPix of the pixels in the block (see step D13).

In the operation applied to each pixel, first, the reference switch 208 is operated in accordance with the value of Ref [pix] (see step D7), so that the reference buffer is set to the decoded camera image memory 206 (see step D8) or the decoded differential image memory 207 (see step D9).

Next, the value Pred of pixel pix is predicted in the prediction mode pmode[Ref[pix]] (see step D10).

Then, the decoded value Dec[pix] of the differential image is obtained by the sum of Dres[pix] and Pred (see step D11).

In the present embodiment, disparity information, which indicates to which position on the image of camera B each pixel on the reference camera image corresponds, is obtained outside the video encoding apparatus 100 or the video decoding apparatus 200, and the information is encoded, transmitted, and decoded.

However, the disparity information may be obtained and encoded in the video encoding apparatus 100, and the encoded information may be output together with encoded data of the differential image. Similarly, the disparity information may be received in the video decoding apparatus 200, and the received information may be decoded and used.

In addition, information, which does not directly indicate to which position on the image of camera B each pixel on the reference camera image corresponds, but provides the above-described corresponding relationship due to a conversion applied to the information, may be input and converted to disparity information (which indicates the corresponding relationship) in the video encoding apparatus 100 and the video decoding apparatus 200.

As an example of such information, there is information consisting of three-dimensional information of an imaged object and camera parameters. The three-dimensional information may be three-dimensional coordinates of each part of the imaged object, or may indicates a distance from the imaged object to the relevant camera.

Additionally, in the embodiments, switching of the reference image group as the reference target can be performed for each pixel in the encoding target camera image. However, the switching may be performed for a specific section unit which includes a plurality of pixels. For example, when the switching can be performed for each block having a specific size, a reference target suitable for a number of pixels in the block may be selected, or the decoded camera image group may be selected if the block includes at least one pixel whose pixel value of the disparity-compensated image is ineffective. Selection based on an appropriate section unit can reduce the processing time.

The video encoding and decoding processes as described above can be implemented using a hardware or firmware resource, and can also be implemented using a computer and a software program. The computer program may be provided by storing it in a computer-readable storage medium, or by means of a network.

INDUSTRIAL APPLICABILITY

In accordance with the present invention, when subjecting a differential image obtained by disparity compensation to predictive encoding, no new additional information is used, and an appropriate reference image is used through a switching operation for each pixel. Therefore, the residual for the encoding target can be reduced without increasing the amount of code required for the additional information, thereby implementing efficient video encoding of the entire multi-viewpoint video image.

The invention claimed is:

1. A video encoding method of encoding a multi-viewpoint video image by using disparity compensation, the method comprising the steps of:

generating, based on disparity information between a reference camera image, which is obtained by decoding an already-encoded camera image, and an encoding target camera image corresponding to the reference camera image, a disparity-compensated image for the encoding target camera image;

setting reference target information, which indicates a reference image group as the reference target, for each predetermined section unit on the encoding target camera image in accordance with a state of the disparity-compensated image;

selecting, for each predetermined section unit on the encoding target camera image, one of a decoded differential image group, which includes decoded differential images, each obtained by decoding an already-encoded differential image between a camera image and a disparity-compensated image, and a decoded camera image group, which includes decoded camera images, each obtained by decoding an already-encoded camera image, as the reference target based on the set reference target information, where the decoded differential images and the decoded camera images each have the same view point as that of the encoding target camera image;

predictive-encoding a differential image between the encoding target camera image and the disparity-compensated image by referring to a reference image included in the image group selected as the reference target;

storing a decoded differential image, which is obtained by decoding the encoded differential image, as a constituent of the decoded differential image group; and storing a decoded camera image, which is obtained by decoding the encoding target camera image, which was already encoded, based on the decoded differential image, as a constituent of the decoded camera image group, wherein in the step of setting the reference target information, the reference target information is set in accordance with presence or absence of the disparity-compensated image; and in the step of selecting one of the decoded differential image group and the decoded camera image group, when the reference target information indicates that the disparity-compensated image is present, the decoded differential image group is selected, and when the reference target information indicates that the disparity-compensated image is absent, the decoded camera image group is selected.

2. The video encoding method in accordance with claim 1, wherein:

the step of predictive-encoding the differential image includes computing an encoding cost occurring when each of predetermined prediction methods is applied to each encoding processing block which belongs to the differential image and consists of a plurality of pixels, where video prediction of one encoding processing block is performed using a single prediction method which provides the minimum encoding cost.

3. The video encoding method in accordance with claim 1, wherein:

the step of predictive-encoding the differential image includes computing an encoding cost occurring when each of predetermined prediction methods is applied to each pixel group in each encoding processing block which belongs to the differential image and consists of a plurality of pixels, where each pixel group has an individual reference image, and encoding is performed while selecting whether video prediction of one encoding processing block is performed using a single prediction method or a plurality of prediction methods, in accordance with the computed costs.

4. The video encoding method in accordance with claim 1, wherein the predetermined section unit is a pixel.

5. A video decoding method of decoding a multi-viewpoint video image by using disparity compensation, the method comprising the steps of:

generating, based on disparity information between an already-decoded reference camera image and a decoding target camera image corresponding to the reference camera image, a disparity-compensated image for the decoding target camera image;

setting reference target information, which indicates a reference image group as the reference target, for each predetermined section unit on the decoding target camera image in accordance with a state of the disparity-compensated image;

selecting, for each predetermined section unit on the decoding target camera image, one of a decoded differential image group which includes decoded differential images, each of which is an already-decoded differential image between a camera image and a disparity-compensated image, and a decoded camera image group which includes decoded camera images, each of which is an already-decoded camera image, as the reference target based on the set reference target information, where the decoded differential images and the decoded camera images each have the same view point as that of the decoding target camera image;

decoding a differential image between the decoding target camera image and the disparity-compensated image by referring to a reference image included in the image group selected as the reference target, based on a prediction residual of each pixel, which is obtained by decoding input encoded data;

storing the decoded differential image as a constituent of the decoded differential image group; and adding the decoded differential image to the disparity-compensated image, outputting the sum of them as a decoded camera image of the multi-viewpoint video image, and storing the decoded camera image as a constituent of the decoded camera image group, wherein in the step of setting the reference target information, the reference target information is set in accordance with presence or absence of the disparity-compensated image; and in the step of selecting one of the decoded differential image group and the decoded camera image group, when the reference target information indicates that the disparity-compensated image is present, the decoded differential image group is selected, and when the reference target information indicates that the disparity-compensated image is absent, the decoded camera image group is selected.

6. The video decoding method in accordance with claim 5, wherein:

the step of decoding the differential image includes decoding the differential image in a manner such that a single designated prediction method is applied to each decoding processing block which belongs to the decoding target camera image and consists of a plurality of pixels.

7. The video decoding method in accordance with claim 5, wherein:

the step of decoding the differential image includes decoding the differential image while selecting for each decoding processing block which belongs to the decoding target camera image and consists of a plurality of pixels, whether a single designated prediction method or a plurality of designated prediction methods is used.

8. The video decoding method in accordance with claim 5, wherein the predetermined section unit is a pixel.

9. A video encoding apparatus for encoding a multi-viewpoint video image by using disparity compensation, the apparatus comprising:

a device for generating, based on disparity information between a reference camera image, which is obtained by decoding an already-encoded camera image, and an encoding target camera image corresponding to the reference camera image, a disparity-compensated image for the encoding target camera image;

a device for setting reference target information, which indicates a reference image group as the reference target, for each predetermined section unit on the encoding target camera image in accordance with a state of the disparity-compensated image;

a device for selecting, for each predetermined section unit on the encoding target camera image, one of a decoded differential image group, which includes decoded differential images, each obtained by decoding an already-encoded differential image between a camera image and a disparity-compensated image, and a decoded camera image group, which includes decoded camera images, each obtained by decoding an already-encoded camera image, as the reference target based on the set reference target information, where the decoded differential images and the decoded camera images each have the same view point as that of the encoding target camera image;

a device for predictive-encoding a differential image between the encoding target camera image and the disparity-compensated image by referring to a reference image included in the image group selected as the reference target;

a device for storing a decoded differential image, which is obtained by decoding the encoded differential image, as a constituent of the decoded differential image group; and a device for storing a decoded camera image, which is obtained by decoding the encoding target camera image, which was already encoded, based on the decoded differential image, as a constituent of the decoded camera image group, wherein the device for setting the reference target information sets the reference target information in accordance with presence or absence of the disparity-compensated image; and the device for selecting one of the decoded differential image group and the decoded camera image group selects:

the decoded differential image group when the reference target information indicates that the disparity-compensated image is present; and the decoded camera image group when the reference target information indicates that the disparity-compensated image is absent.

10. The video encoding apparatus in accordance with claim 9, wherein the predetermined section unit is a pixel.

11. A video decoding apparatus for decoding a multi-viewpoint video image by using disparity compensation, the apparatus comprising:

a device for generating, based on disparity information between an already-decoded reference camera image and a decoding target camera image corresponding to the reference camera image, a disparity-compensated image for the decoding target camera image;

a device for setting reference target information, which indicates a reference image group as the reference target, for each predetermined section unit on the decoding target camera image in accordance with a state of the disparity-compensated image;

a device for selecting, for each predetermined section unit on the decoding target camera image, one of a decoded differential image group which includes decoded differential images, each of which is an already-decoded differential image between a camera image and a disparity-compensated image, and a decoded camera image group which includes decoded camera images, each of which is an already-decoded camera image, as the reference target based on the set reference target information, where the decoded differential images and the decoded camera images each have the same view point as that of the decoding target camera image;

a device for decoding a differential image between the decoding target camera image and the disparity-compensated image by referring to a reference image included in the image group selected as the reference target, based on a prediction residual of each pixel, which is obtained by decoding input encoded data;

a device for storing the decoded differential image as a constituent of the decoded differential image group; and a device for adding the decoded differential image to the disparity-compensated image, outputting the sum of them as a decoded camera image of the multi-viewpoint video image, and storing the decoded camera image as a constituent of the decoded camera image group, wherein the device for setting the reference target information sets the reference target information in accordance with presence or absence of the disparity-compensated image; and the device for selecting one of the decoded differential image group and the decoded camera image group selects:

the decoded differential image group when the reference target information indicates that the disparity-compensated image is present; and the decoded camera image group when the reference target information indicates that the disparity-compensated image is absent.

12. The video decoding apparatus in accordance with claim 11, wherein the predetermined section unit is a pixel.

13. A non-transitory computer-readable storage medium which stores a video encoding program by which a computer executes a process for implementing the video encoding method in accordance with claim 1.

14. A non-transitory computer-readable storage medium which stores a video decoding program by which a computer executes a process for implementing the video decoding method in accordance with claim 5.

* * * * *